James B. Forsyth.

Impd. Roller for Clothes Wringers.

4244 REISSUED JAN 31 1871

*Witnesses:-*
Wm. H. Rowe
Baltis De Long

*Inventor:-*
James B. Forsyth
by his Atty
Wm. D. Baldwin

NORRIS PETERS, INC., LITHO., WASHINGTON, D. C.

UNITED STATES PATENT OFFICE.

JAMES B. FORSYTH, OF BOSTON, MASSACHUSETTS.

IMPROVEMENT IN THE MANUFACTURE OF INDIA-RUBBER ROLLERS.

Specification forming part of Letters Patent No. 59,580, dated November 13, 1866; Reissue No. 2,589, dated May 7, 1867; Reissue No. 4,244, dated January 31, 1871.

*To all whom it may concern:*

Be it known that I, JAMES B. FORSYTH, of Boston, in the county of Sulfolk and State of Massachusetts, have invented certain Improvements in Rollers for Clothes-Wringers and other Purposes, of which the following is a specification.

Figure 1:
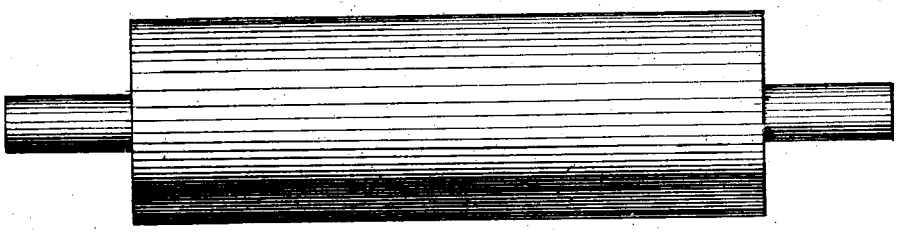
Figure 2:
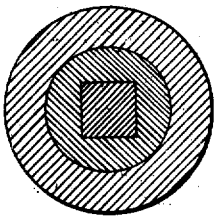

In the drawings, Figure 1 is a plan or side elevation of the roller and its shaft, and Fig. 2 a transverse diametrical section through the same.

Rollers of the ordinary construction, composed of soft and elastic rubber of the same consistency throughout, are objectionable, for the reason that soft rubber of the elasticity required in the roller is not well adapted to resist the strain to which it is subjected, and the turn in the roller when in use, and consequently such rollers soon become loosened from their shafts or torn apart.

The object of my invention is to overcome these objections; and it consists in strengthening that portion of the roller which is subjected to the greatest strain by diminishing its elasticity in such a way as not practically to impair the elasticity of the whole roller, nor otherwise affect it injuriously.

In forming a roller according to my invention I use two vulcanizable compounds—one to surround the shaft and form the interior portion, and the other the outer portion of the elastic cylinder which forms the roller, the former being a compound that, when cured by the well-known process of vulcanization for producing "soft rubber," so called, will be less elastic, and consequently harder, than the product of the other compound, which is that ordinarily used for forming the whole cylinder. These compounds are made in a variety of ways, as to ingredients and proportions, well known to all familiar with the manufacture of rubber; and it is known to any one skilled in the art that by adopting the proper proportions of such ingredients in the compound the rubber may be made of a greater degree of hardness and of less elasticity than the rubber ordinarily used in rollers, and that the compound will nevertheless be vulcanizable at the temperature ordinarily used for soft rubber.

It is also well known to all skilled in the art that the use of fibrous material, in connection with a vulcanizable compound, will make the product less elastic, and consequently harder, and that the fibrous material can be ground up or mixed with the other ingredients, or that the compound formed by the other ingredients can be spread upon the cloth or fibrous material.

The ingredients of the compounds are intimately mixed and comminuted in the well-known way, and said compound is formed into sheets. When a fibrous material is used, the fibers are either ground up or mixed with the other ingredients, so as to form one ingredient of the compound, or else the compound is spread upon the fibrous material. The sheets thus formed are wound upon a mandrel or former until a cylinder is formed large enough, when cured, to form the elastic cylinder, sheets of the compound designed to produce the semi-elastic and harder product being used first until the cylinder is about one-half the required diameter, and the sheets of the compound designed to produce the more elastic and softer rubber being wound upon the cylinder first formed. The whole is then cured and finished in any of the well-known ways of curing and finishing. Instead of the former or mandrel, the sheets of the semi-elastic rubber compound can be wound directly upon the shaft of the roller, rubber current being first applied to the shaft, the rest of the process being the same, except that the roller is cured directly upon its shaft instead of upon a mandrel. When the elastic cylinder is formed and cured upon a mandrel, the shaft is more readily inserted if the cylinder be first put into hot water, as the stock is thereby temporarily softened and rendered more elastic, and it is consequently easier to force the cylinder onto its shaft, especially when rubber current has been applied to the shaft.

The fibrous material is unnecessary when the other ingredients of one of the compounds are proportioned to produce a semi-elastic rubber; but when the same compound is used for the whole roller fibrous material must be used in connection with that portion of the compound which forms the inner portion of the roller in order to make that portion semi-elastic.

I prefer to use fibrous material, even with the compound, to produce the semi-elastic rubber, for the reason that the strength and tenacity of the stock is increased, and the curing is more easily effected, the fibers being better conductors of heat than the compound. The proper kinds of fibrous material are well known to all skilled in the art.

The best compound known to me for forming the interior of the roller, taking into view cheapness as well as adaptability, is the following: india-rubber, four pounds; uncured rubber rags of unvulcanized sheets of cloth and rubber or trimmings, four pounds; flour of sulphur, five pounds; white oxide of zinc, two pounds; calcined magnesia, one-eighth of a pound, cured at the heat ordinarily used for curing "soft rubber," so called. If a dark color be desired, add one-fourth of a pound of lamp-black.

I am aware that two different compounds—namely, a compound for producing "hard rubber" or vulcanite, and the ordinary compound for producing the soft elastic rubber of which rollers are usually made—have been used together to form a roller, the hard-rubber compound forming the core; but this is objectionable, because a much greater heat is required to vulcanize the hard-rubber core than the soft-rubber exterior, and also because of the great difficulty in obtaining a perfect union between the soft-rubber exterior and the hard-rubber core. The whole character, also, of the roller is altered, because a portion of it (the hard-rubber core) is almost as inelastic as its shaft. The soft rubber is also very liable to be injured by the high heat necessary to produce the hard-rubber core, if the two are vulcanized together, while when two compounds are used, both of which are cured at a soft-rubber heat, the whole roll can be cured at one operation at a temperature suited to all its parts. The union between the harder semi-elastic rubber forming the interior and the soft elastic rubber forming the exterior is as perfect as the union between the several layers of the two compounds, and the core is sufficiently elastic not to practically affect the character of the roller as to elasticity, and yet much better adapted to resist strain than the soft rubber forming the exterior.

I do not claim to have invented any new vulcanizable compound, nor any method of forming such a compound into a roller, nor any method of curing vulcanizable compounds; and I disclaim a roller with a core of hard rubber or vulcanite and a soft-rubber exterior; but What I do claim as my invention is—

1. As a new article of manufacture, a rubber roller, constructed substantially as described, whose interior portion consists of rubber made semi-elastic by either or both the methods above described.

2. The process above described of making rollers, consisting in forming the roller of two rubber compounds, such as are above described, one for the interior portion and the other for the exterior portion of the roller, and curing or vulcanizing them at a heat suitable for vulcanizing soft rubber, all as and for the purpose specified.

JAMES B. FORSYTH.

Witnesses:

JAMES WILSON.

THOMAS A. FORSYTH.